United States Patent [19]

Kervinen

[11] Patent Number: 5,347,551
[45] Date of Patent: Sep. 13, 1994

[54] METHOD FOR EXAMINING IRRADIATED FUEL BUNDLE SPACER SPRINGS USING FIBER-OPTIC VISUAL INSPECTION EQUIPMENT

[75] Inventor: John A. Kervinen, Palo Alto, Calif.

[73] Assignee: General Electric Company, San Jose, Calif.

[21] Appl. No.: 87,563

[22] Filed: Jul. 9, 1993

[51] Int. Cl.$^5$ .............................................. G21C 17/00
[52] U.S. Cl. ...................................... 376/248; 376/249
[58] Field of Search ............... 376/248, 249, 260, 441, 376/439, 457, 446; 358/901; 350/73.1; 356/73.1

[56] References Cited

U.S. PATENT DOCUMENTS

| | | | |
|---|---|---|---|
| 3,856,000 | 12/1974 | Chikama | 128/6 |
| 4,255,762 | 3/1981 | Takeyasu et al. | 358/100 |
| 4,605,531 | 8/1986 | Leseur et al. | 376/252 |
| 4,657,728 | 4/1987 | Coppa et al. | 376/248 |
| 4,735,483 | 4/1988 | Kuroiwa et al. | 350/96.26 |
| 4,764,334 | 8/1988 | King et al. | 376/248 |

OTHER PUBLICATIONS

Advertisement Bulletin published by Furukawa Electric Co. of Japan.

Primary Examiner—Donald P. Walsh
Assistant Examiner—Meena Chelliah
Attorney, Agent, or Firm—J. S. Beulick

[57] ABSTRACT

An improved method for examining fuel bundle spacers using fiber-optic visual inspection apparatus. A distal end of a fiber-optic scope having image and light guides is inserted through an upper tie plate and between the fuel rods of a fuel bundle assembly at the top thereof. The distal end of the scope is then lowered into the space between a group of spacer ferrules until a side aperture of the scope is at the elevation of the spacer spring to be inspected. Light is supplied to the light guide and redirected out the side aperture to a spot proximal to the field of view of the image guide. The distal end of the scope is rotated until the spacer spring to be inspected is visible through an ocular lens coupled to the image guide. The spring is visually inspected for defects by moving the scope to scan the spacer spring.

19 Claims, 5 Drawing Sheets

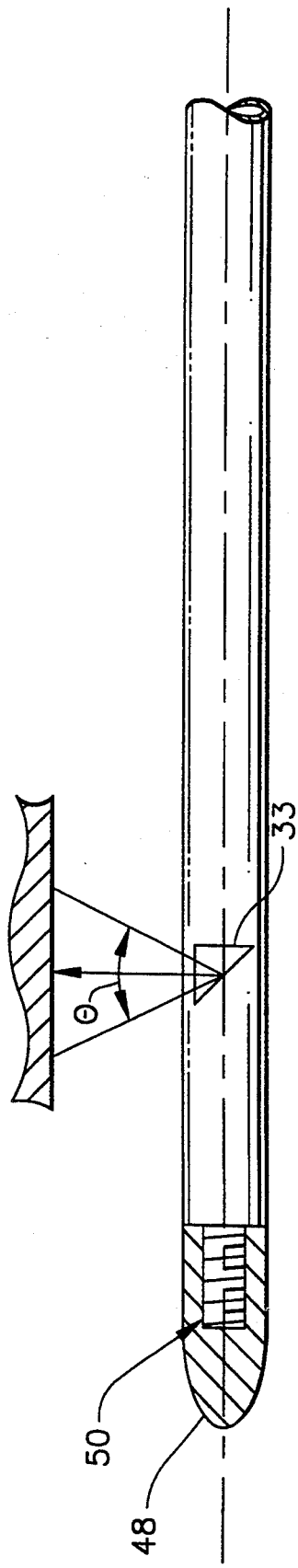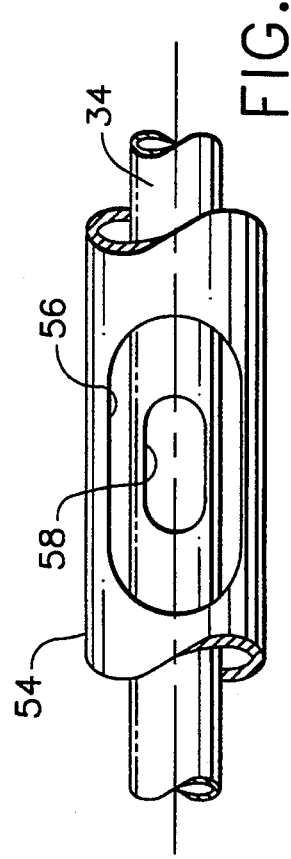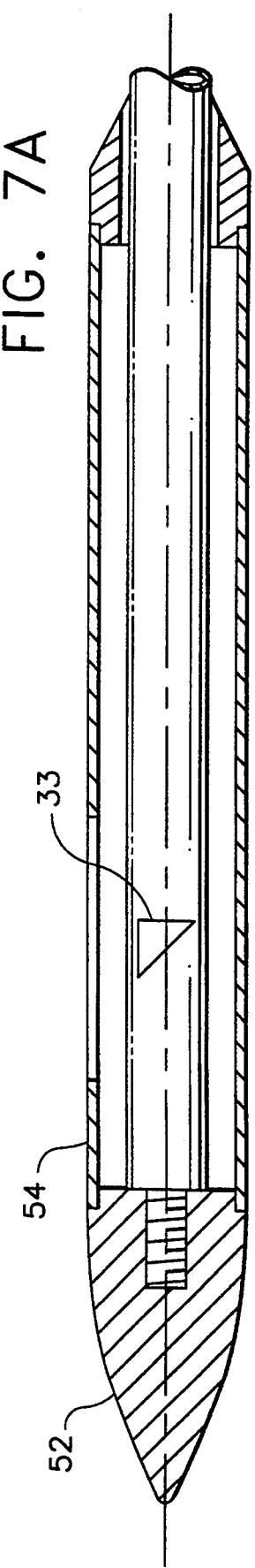

METHOD FOR EXAMINING IRRADIATED FUEL BUNDLE SPACER SPRINGS USING FIBER-OPTIC VISUAL INSPECTION EQUIPMENT

FIELD OF THE INVENTION

This invention generally relates to the inspection of nuclear fuel bundles in a conventional boiling water reactor (BWR). In particular, the invention relates to methods of examining fuel bundle spacers using fiberoptic visual inspection apparatus.

BACKGROUND OF THE INVENTION

Fissionable fuel materials such as oxides of uranium, plutonium or thorium, and combinations thereof, are typically formed into small cylindrical slugs or pellets and housed within sealed tubes or elongated containers sometimes referred to in the art as "cladding". Large-capacity power-generating nuclear fission reactor plants normally have several hundred sealed cladding tubes for housing fissionable fuel. To facilitate periodic refueling, which commonly is performed by replacing fractional portions of the total fuel at intervals and rearranging other fractional portions, these fuel rods or pins are conventionally assembled into bundles or groups of elements which can be handled and manipulated as a single composite unit.

The fuel rods of each bundle are held mutually parallel and spaced apart by mechanical means. A typical fuel bundle comprises, e.g., an 8×8 or 9×9 array of spaced fuel rods. The cladding is usually more than 10 ft long, e.g., 14 ft, and approximately ½ inch in diameter, the cladding tubes being spaced from each other by a fraction of an inch. The spacing is required to permit an ample flow of heat-removing coolant, such as water, over the full exterior surface of the cladding for effective heat transfer and thus effective reactor operation.

To inhibit the fuel rods from bowing and vibrating due to high heat and high velocities of coolant flowing thereabout, which could cause adjacent fuel rods to contact and in any case could impede or unbalance coolant flow, the fuel rods are retained in a spaced-apart array or relation by means of a plurality of spacing grids (hereinafter "spacers") positioned at intervals along the fuel rod length.

A typical spacer comprises a plurality of parallel cells which are welded to each other and to a surrounding spacer band to form a lattice of cells. Each cell receives one fuel rod. Each fuel rod passes through a plurality, e.g., seven, of spacers. These spacers are mutually aligned and spaced along the length of the fuel rods. Each spacer receives a different axial portion of the plurality of fuel rods making up the fuel bundle. The spacers provide intermediate restraint and support transverse of the fuel rods, thereby preventing lateral bowing and vibration which could damage the fuel rods or impede effective coolant flow intermediate and around each fuel rod. Spacers for securing bundles of fuel rods often incorporate spring and stop members which press against the fuel rods in metal-to-metal contact as a means of securely gripping and holding the fuel rods in position. The fuel rods additionally have their ends supported in respective sockets of upper and lower tie plates.

The fuel rod bundle assembly is also typically surrounded by an open-ended tubular fuel channel of suitable cross section, e.g., square. The fuel channel directs the flow of coolant longitudinally along the surface of the fuel rods and guides the neutron-absorbing fission control rods which reciprocate longitudinally intermediate adjacent bundles.

Referring to FIG. 1, a typical nuclear fuel bundle 10 comprises a group of spaced-apart, mutually parallel fuel rods 12. Each fuel rod comprises a cylindrical container 14 (i.e., cladding) which houses a vertical stack of pins or slugs of fissionable fuel (not shown) sealed therein. Each fuel rod 12 is transversely secured in the parallel array by a series of spacers 16 positioned at intervals along the length of the fuel rods. The ends of the fuel rods of each bundle are fixed within respective sockets of upper and lower tie plates 18 and 20. The bundle assembly of grouped fuel rods 12 and spacers 16 is surrounded by an open-ended fuel channel 22.

FIG. 2 shows a top view of a typical spacer 16 comprising a plurality of parallel cells or ferrules 25 welded to each other and to a spacer band 27 to form a lattice or grid. Less than all of the ferrules 25 are shown for the sake of convenience.

As best seen in FIGS. 3A and 3B, each pair of adjacent spacer ferrules 25 and 25' share a common spacer spring 26 which biases fuel rods 12 and 12' in opposite directions toward a respective set of stops 24. In the absence of intervening means for deflecting the spring, the spring will be deflected by contact with the fuel rod. The interference between spring 26 and the fuel rods 12 and 12' is best seen in FIG. 3B. The spring 26 exerts a force of several pounds on the surface of each fuel rod during contact.

The structural components of the spacers—especially the spacer springs—must be periodically inspected for defects, such as cracks, corrosion, erosion and separated weld joints. Historically, inspection of irradiated fuel bundle spacers has required the complete disassembly of a fuel bundle at a reactor site in order to retrieve the spacers. The spacers are loaded into a cask, which is certified for shipment of radioactive materials, and shipped to a radioactive materials laboratory for destructive inspection. The above process, aside from being expensive and time consuming, does not allow reinstallment of the spacers for additional exposure to the reactor environment.

A fiber-optic scope, which is specifically constructed to perform examinations of fuel bundle spacers, permits the examination of spacers at the reactor site without the need to disassemble or otherwise disturb the bundle. After the examination, the bundle remains in the reactor core for additional exposure.

It is essential that the spacer springs be inspected because in some cases spacer springs may fail. This raises the specter of pieces of spring breaking off and recirculating in the coolant. Such pieces may block the flow of coolant through a fuel bundle when lodged in a coolant inlet or may even cause damage to the recirculation pump which in turn might break up into pieces. To avoid such failure, it is essential that the spacer springs be inspected.

Conventional fiber-optic scopes of a first type are constructed to enter the fuel bundle from a side and to view the spacer components from above or below. Scopes of the side-entry type require cumbersome and expensive manipulators for locating the scope within the fuel bundle. Conventional fiber-optic scopes of a second type are designed to be inserted from above into a spacer ferrule having its fuel rod removed. Scopes of the first type comprise a flat array of optical guides which, although thin enough to fit between adjacent rows of fuel rods, cannot be inserted into a spacer ferrule.

A known fiber-optic scope of the side-entry variety comprises a flat array of optical guides. The distal end of that scope is constructed as shown in FIGS. 4A, 4B and 4C. Light is supplied to the spot to be inspected by light guides 30a and 30b; light reflected from the inspected spot is transmitted to an ocular lens (not shown) via an image guide 32. Each guide consists of a bundle of fused optical fibers terminating at a planar interface of a respective prism 34. Each prism reflects incoming light at its inclined back interface, preferably by an angle of 90°. The flat array may consist of any number of guides arranged in a repeating pattern of two light guides followed by one image guide or any other suitable pattern. These known scopes require a cumbersome manipulator and cannot be inserted inside the spacer ferrules.

SUMMARY OF THE INVENTION

The present invention is an improved method for inspecting irradiated fuel bundle spacer springs using a fiber-optic scope. In accordance with the method, the scope is inserted from the top of the fuel bundle after the fuel bundle has been removed from the reactor core and transported to the fuel preparation machine in the fuel storage pool. The fuel bundle remains intact as the spacer spring is inspected in situ.

In particular, the fiber-optic scope of the invention can be applied in two different ways. First, the scope can be used to visually examine the spacer spring in profile from a point located between the ferrules. In accordance with this technique, the scope is inserted through an opening in the upper tie plate and lowered into the space between the spacer ferrules being inspected. Second, the scope can be used to visually examine the faces of the spacer spring from points inside the two ferrules which have that spacer spring in common. This inspection technique requires that first the upper tie plate and then the fuel rods inside the ferrules be removed.

In accordance with the invention, the fiber-optic scope can be positioned manually by an operator standing on the refueling floor adjacent to the fuel preparation machine. No cumbersome manipulator is required, as is the case for conventional side-entry scopes.

The fiber-optic scope in accordance with the preferred embodiment of the invention comprises an image guide and a pair of light guides, each guide being formed by a bundle of radiation-tolerant flexible fused quartz fibers. The guides are not arranged with their centers lying along a line, but rather are arranged with their centers at the vertices of a triangle.

The light guides are optically coupled at one end to a light source and have respective prisms in the distal end for illuminating a field of view, i.e., for reflecting light toward the area or spot to be inspected. Light reflected from the field of view impinges on a prism arranged in the distal end of the image guide. The distal end of the image guide is also provided with a lens assembly with a specified field of view, the fixed focus lens being generally oriented perpendicular to the axis of the image guide. The other end of the image guide is optically coupled to an ocular lens assembly with focus adjustment so that the ocular lens is focused on the ends of the fibers of the image guide.

The distal ends of the guides are encased in a rigid sheath. The sheath is provided with a side aperture which serves as a window through which light freely propagates between the prisms and the surface to be inspected. The portions of the guides between the rigid sheath and the eyepiece body housing the ocular lens are encased in a semi-flexible insertion tube. The flexibility of the insertion tube facilitates insertion of the rigid sheath deep into the fuel bundle.

The casing and guide configuration of the fiberoptic scope in accordance with the preferred embodiment of the invention are designed to allow insertion of the distal end of the scope into the space between the ferrules of the spacer. The fiber-optic scope is inserted into the fuel bundle from the top through the upper tie plate. Then the distal end of the scope is lowered to the level of the spacer to be inspected. The scope has sufficient torsional rigidity to allow azimuthal orientation of the distal lens assembly within the spacers by the rotation of the ocular lens assembly.

In addition, the spacer may also be inspected from within the ferrule. This requires the removal of the upper tie plate and a fuel rod. For this application the scope is fitted with a guide tube to reduce the clearance between the ferrule and the scope so as to stabilize the scope during the inspection.

BRIEF DESCRIPTION OF THE DRAWINGS

FIG. 6 is a diagram showing a fiber-optic scope in accordance with the preferred embodiment of the invention, having a nosepiece adapted so that the scope can be inserted between the spacer ferrules.

FIG. 7A is a diagram showing a fiber-optic scope in accordance with the preferred embodiment of the invention, having a nosepiece adapted so that the scope can be inserted inside the spacer ferrules.

FIG. 7B is a diagram illustrating the structure of the scope of FIG. 7A in the vicinity of the side aperture of the guide tube.

DETAILED DESCRIPTION OF THE PREFERRED EMBODIMENTS

Figure 1:
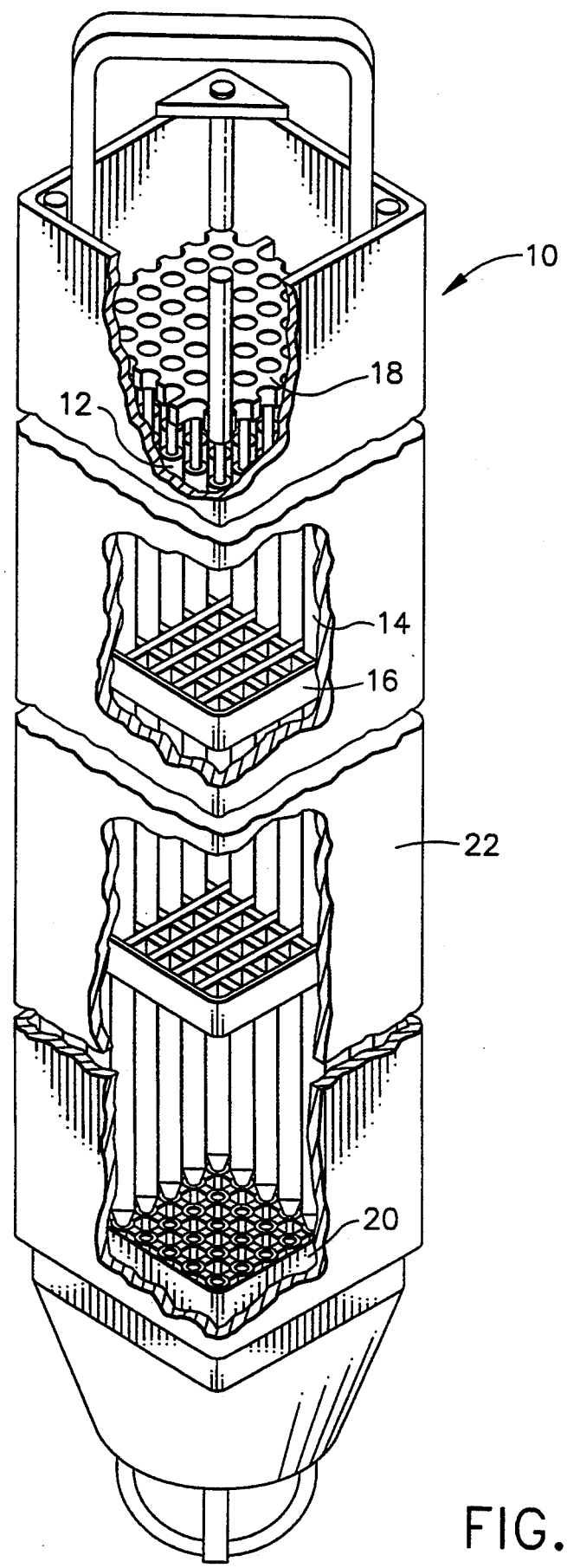
FIG. 1 is a perspective view, partly in section and not to scale, of a nuclear fuel bundle assembly.
Figure 2:
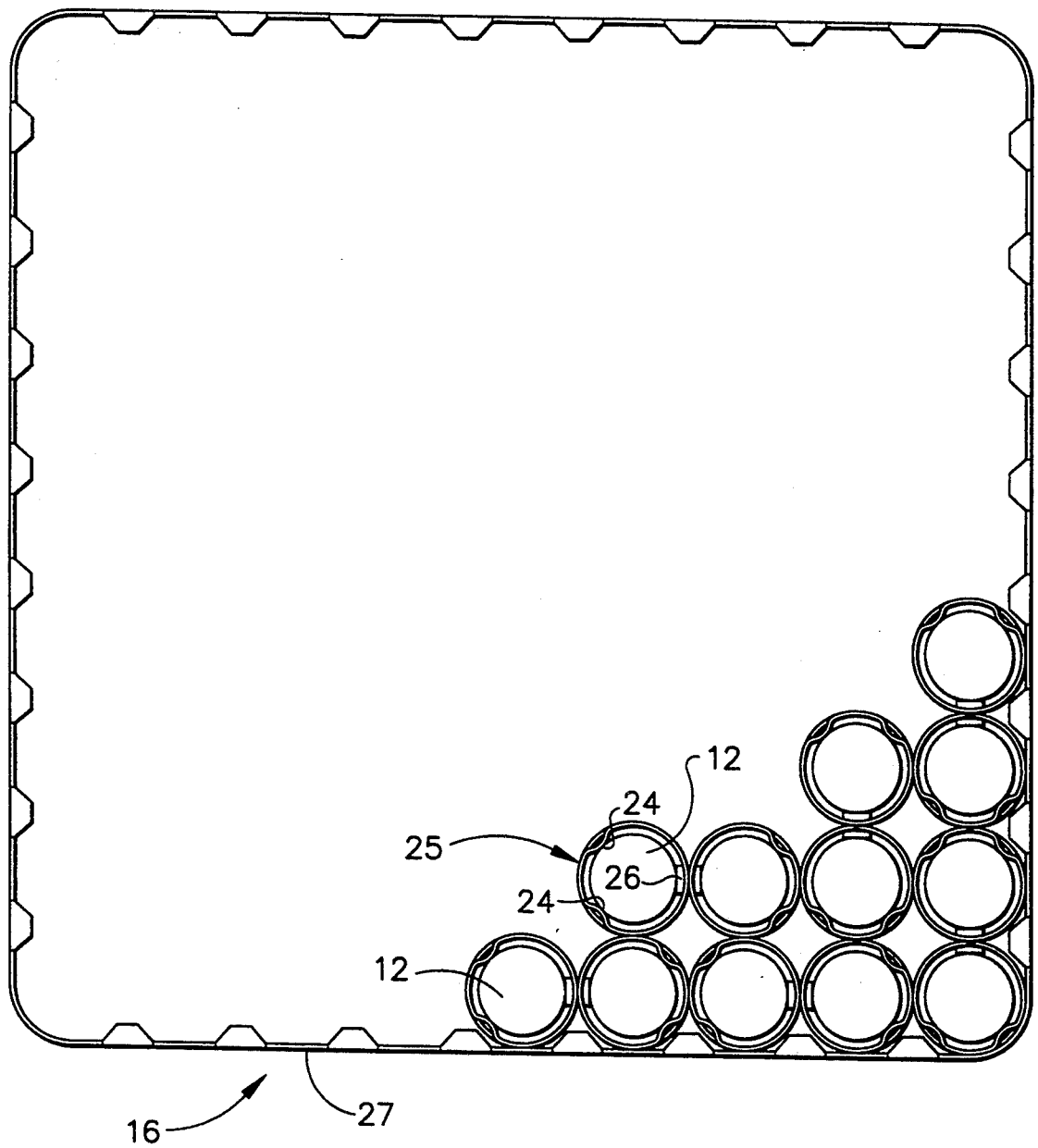
FIG. 2 is a top view showing less than all of the spacer cells of a typical spacer.
Figure 3A:
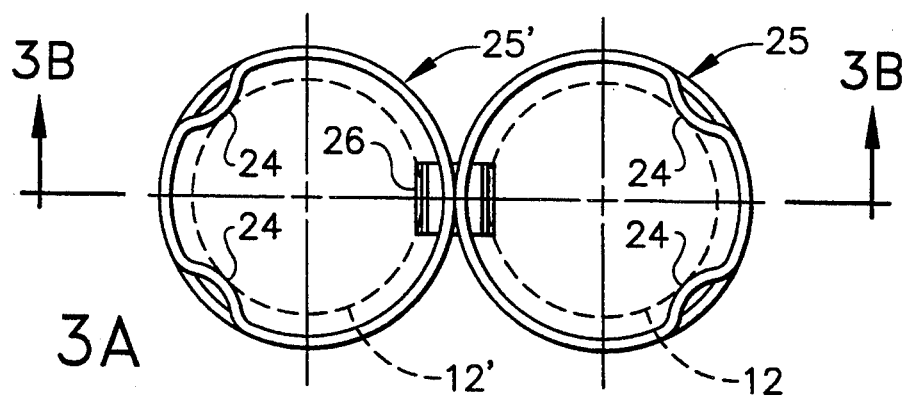
FIGS. 3A and 3B are top and elevation views respectively of paired spacer cells having a common spring.
Figure 3B:
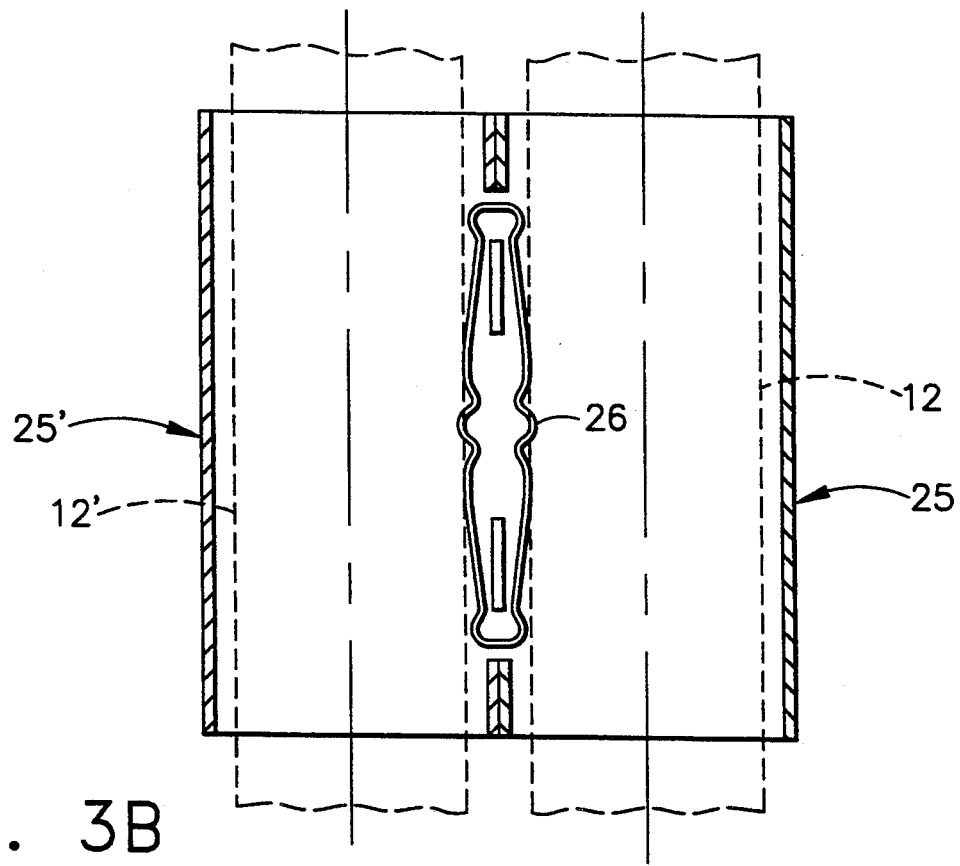
Figure 4A:
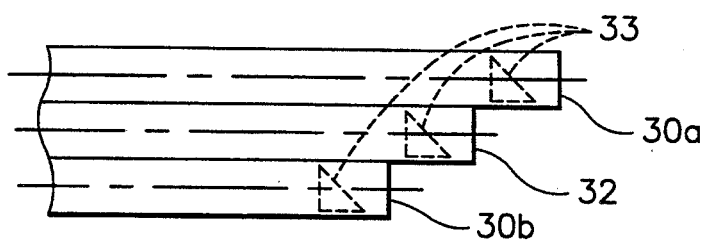
FIGS. 4A, 4B and 4C are side, end and bottom views, respectively of the distal end of a conventional fiberoptic scope of the side-entry variety.
Figure 4B:
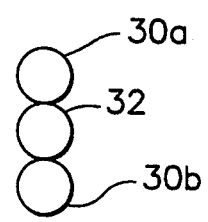
Figure 4C:
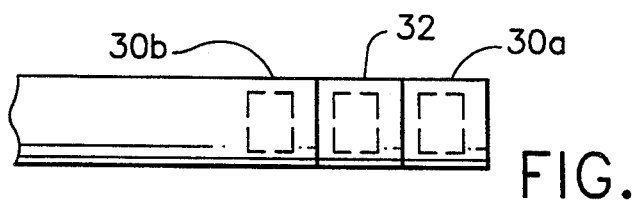
Figure 5A:
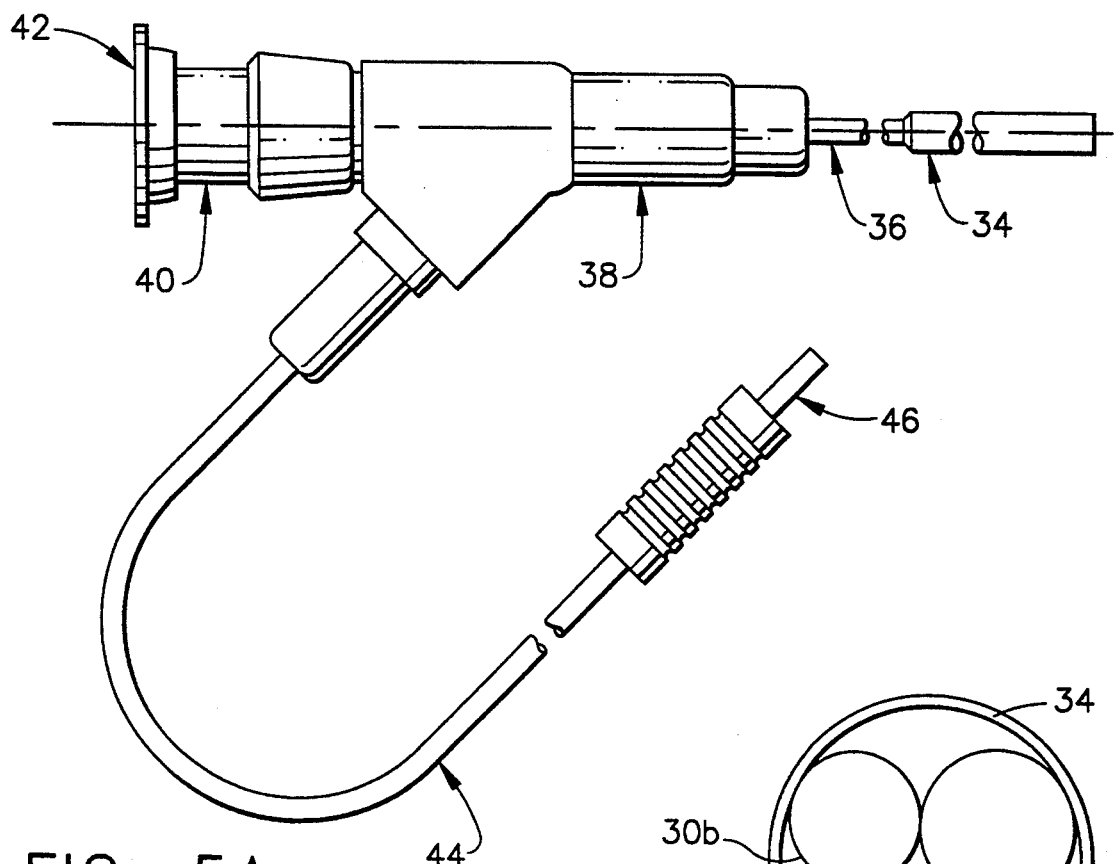
FIG. 5A is a side view of a fiber-optic scope in accordance with the preferred embodiment of the invention.
Figure 5B:
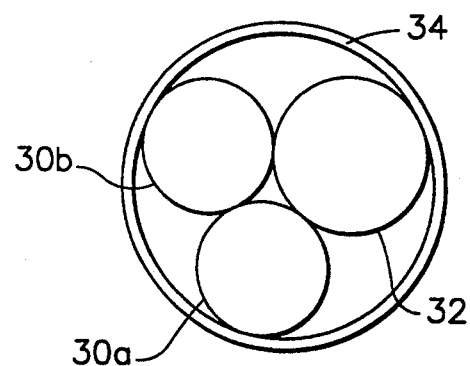
FIG. 5B is a sectional view taken through the distal end of the scope.

A fiber-optic scope in accordance with the preferred embodiment of the invention is shown in FIGS. 5A and 5B. Referring to FIG. 5B, light is supplied to the spot to be inspected by light guides 30a and 30b. The light guides are optically coupled at one end to a light source by way of a light guide cable 44 and a light guide plug 46 (see FIG. 5A). Each light guide has a prism (not shown) in the distal end for illuminating the field of view. The prisms are arranged so that the projected light impinges on spots above and below the field of view of the image guide, not directly on the field of view. Any number of light guides can be used provided that the diameter of the distal end of the scope can be fitted in between the spacer ferrules.

Light reflected from the field of view impinges on a prism 33 (see FIG. 6) arranged in the distal end of the image guide 32. The direction of view is to the side at an angle of 90° to the guide axis. The distal end of the image guide is also provided with a fixed focus lens (not shown) with a specified field of view, the fixed focus lens being generally oriented perpendicular to the axis of the image guide. The field of view $\theta$ (see FIG. 7) of an exemplary image guide is 30° in air and 22° in water; the depth of view is 1.9–3 mm in air and 3.1–4.8 mm in water.

The image guide comprises a bundle of fused optical fibers, each fiber providing a pixel of optical information. In accordance with an exemplary construction, the number of optical fibers in the image guide is approximately 12,000.

Light reflected from the field of view is transmitted to an ocular lens located inside eyepiece body 38 via image guide 32. The focus of the ocular lens is adjustable by rotation of ocular focusing adjusting dial 40. The ocular lens assembly has a ring adaptor 42 which enables the attachment of a 35 mm camera for still photography or a video camera for videotaping.

As best seen in FIG. 5B, the light guides 30a and 30b and the image guide 32 are arranged with their centers at the vertices of a triangle. The distal ends of the guides are encased in a rigid sheath 34 (only a portion of which is shown in FIG. 5A), preferably made of stainless steel. The sheath 34 is provided with a side aperture 58 (see FIG. 7B) at the elevation of the prisms, which aperture allows propagation of light between the surface to be inspected and the prisms.

The portions of the light guides and the image guide extending between the rigid sheath 34 and the eyepiece body 38 housing the ocular lens are encased in a semi-flexible insertion tube 36, preferably made of stainless steel ribbon spirally wound and coated with plastic for water-proofing. In an exemplary construction, the semi-flexible insertion tube has a minimum bending radius of 200 mm. The flexibility of the insertion tube facilitates insertion of the rigid sheath 34 deep into the fuel bundle.

In accordance with one exemplary construction, the distal end (corresponding to rigid sheath 34) has a length a equal to 610 mm, the semi-flexible insertion tube has a length equal to 7390 mm (giving a combined working length b equal to 8000 mm) and the eyepiece body has a length c equal to 200 mm. A 610-mm-long (i.e., 24-inch-long) distal end spans two spacers within the fuel bundle. The diameter of the distal end is 5.5 mm; the diameter of the semi-flexible insertion tube is 5 mm. These dimensions are merely illustrative—any length or diameter can be specified depending on the particular application.

As shown in FIG. 6, the tip of the distal end of the scope has a rounded nosepiece 48 screwed onto a threaded pin 50. The rounded nosepiece facilitates insertion of the distal end into the spaces between ferrules.

In accordance with the method of the invention, the distal end of the scope is inserted between the fuel rods at the top of the fuel bundle assembly; the distal end is lowered into the space between a group of spacer ferrules until the scope side aperture is at the elevation of the spacer spring to be inspected; light is supplied to the light guides and redirected out the side aperture by prisms; the distal end of the scope is rotated until the spacer spring to be inspected is visible through the image guide; and the spacer spring is visually inspected for defects which appear in the image received by the ocular lens by moving the scope to scan the spring.

The fiber-optic scope in accordance with the invention is adaptable for insertion inside a spacer ferrule. In this case, the rounded nosepiece 48 is unscrewed and replaced by a nosepiece 52 having a guide tube 54 (see FIG. 7A) connected thereto, e.g., by welding. Guide tube 54 has a diameter greater than the diameter of sheath 34, but slightly less than the diameter of the spacer ferrules. Guide tube 54 is provided with a side aperture 56 (see FIG. 7B) at the elevation of the prisms, which aperture allows light to propagate between the surface to be inspected and the prisms. The guide tube is eccentric with respect to the rigid sheath so that the distal end will be in focus with the spring. The guide tube serves to stabilize the scope during inspection by reducing the clearance between the scope and the ferrule.

In order to inspect the face of the spacer spring from inside either of the associated ferrules, the upper tie plate and the fuel rod installed in that ferrule must first be removed. The distal end of the scope is then inserted at the top of the space left vacant by the removed fuel rod and lowered into the space inside the vacant ferrule until the side aperture of the scope is at the elevation of the spacer spring. Again light is supplied to the light guide and redirected out the side aperture at an angle of 90°. The distal end of the scope is rotated until the spacer spring to be inspected is visible through the ocular lens. Then the spring is visually inspected for defects by moving the scope to scan the spacer spring.

The preferred embodiment of the invention has been described in detail for the purpose of illustrated only. Variations of and modifications to the preferred embodiment will be readily apparent to those skilled in the art of fiber-optic scopes. All such variations and modifications are intended to be encompassed by the scope of the claims appended hereto.

I claim:

1. A method for inspecting spacer springs of a nuclear fuel bundle assembly having a plurality of spacers, each of said spacers comprising first through fourth ferrules joined in a square array having an inner central space, said first and second ferrules having a common spacer spring, comprising the steps of:

inserting a distal end of a fiber-optic scope having image and light guides through an upper tie plate and between the fuel rods of said fuel bundle assembly at the top thereof;

lowering said distal end of said scope into said inner central space until a side aperture of said scope is at the elevation of said common spacer spring;

supplying light to said light guide and redirecting said light out said side aperture to a spot proximal to the field of view of said image guide; and visually inspecting for defects that portion of said spacer spring which appears in the image received by said ocular lens.

2. The method as defined in claim 1, wherein said scope comprises an image guide and two light guides arranged so that the centers of said guides are located at the vertices of a triangle.

3. The method as defined in claim 1, wherein each of said spacer ferrules is a metal tube of circular cross section.

4. The method as defined in claim 1, wherein the distal end of said scope comprises a metal sheath of circular cross section which encases the distal ends of said image and light guides.

5. The method as defined in claim 4, wherein said distal end of said scope terminates in a rounded nosepiece which enters said inner central space during insertion of said scope.

6. The method as defined in claim 5, further comprising the steps of:
  removing said rounded nosepiece;
  attaching a guide tube to said distal end of said scope so that said guide tube surrounds and is eccentric with respect to said metal sheath, said guide tube having a diameter slightly smaller than the diameter of said spacer ferrules;
  removing said upper tie plate;
  removing a fuel rod from said fuel bundle assembly, said fuel rod passing through said first spacer ferrule;
  inserting said distal end of said scope at the top of the space left vacant by said removed fuel rod;
  lowering said distal end of said scope into said first spacer ferrule until said side aperture of said scope is at the elevation of said common spacer spring;
  supplying light to said light guide and redirecting said light out said side aperture;
  rotating said distal end of said scope until said spacer spring to be inspected is visible through said ocular lens; and
  visually inspecting for defects that portion of said spacer spring which appears in the image received by said ocular lens.

7. The method as defined in claim 1, further comprising the step of recording the image received by said ocular lens.

8. A fiber-optic scope for inspecting a spacer spring of a nuclear fuel bundle assembly, comprising:
  first and second light guides for carrying light from a light source to a distal end of said scope;
  means for redirecting the light carried by said light guides onto a surface to be inspected;
  an ocular lens;
  an image guide for carrying light from said distal end of said scope to said ocular lens;
  means for redirecting light reflected from said surface along said image guide,
  wherein said guides are arranged so that the centers of said guides are located at the vertices of a triangle.

9. The fiber-optic scope as defined in claim 8, wherein the distal end of said scope comprises a rigid metal sheath of circular cross section which encases the distal ends of said image and light guides, said sheath having a predetermined diameter substantially less than the diameter of a ferrule of said spacer to be inspected.

10. The fiber-optic scope as defined in claim 9, wherein said distal end of said scope terminates in a threaded pin on which a nosepiece is screwed, said nosepiece being removable by unscrewing.

11. The fiber-optic scope as defined in claim 10, further comprising a guide tube connected to said nosepiece, said guide tube being eccentric with respect to said sheath and having a diameter greater than said predetermined diameter and slightly less than said diameter of said ferrule of said spacer to be inspected.

12. The fiber-optic scope as defined in claim 11, wherein said sheath and said guide tube each have an aperture opposing said redirecting means, said aperture allowing optical coupling between said redirecting means and said surface to be inspected.

13. A method for inspecting spacer springs of a nuclear fuel bundle assembly having a plurality of spacers, each of said spacers comprising an array of ferrules, respective pairs of said ferrules having a common spacer spring, comprising the steps of:
  inserting a distal end of a fiber-optic scope having image and light guides through an upper tie plate and between the fuel rods of said fuel bundle assembly at the top thereof;
  lowering said distal end of said scope into the space between a group of spacer ferrules until a side aperture of said scope is at the elevation of a spacer spring to be inspected;
  supplying light to said light guide and redirecting said light out said side aperture to a spot proximal to the field of view of said image guide;
  rotating said distal end of said scope until said spacer spring to be inspected is visible through an ocular lens coupled to said image guide; and
  visually inspecting for defects that portion of said spacer spring which appears in the image received by said ocular lens.

14. The method as defined in claim 13, wherein said scope comprises an image guide and two light guides arranged so that the centers of said guides are located at the vertices of a triangle.

15. The method as defined in claim 13, wherein said group of spacer ferrules is a square array of metal tubes of circular cross section.

16. The method as defined in claim 14, wherein said group of spacer ferrules is a square array of metal tubes of circular cross section, and the distal end of said scope comprises a metal sheath of circular cross section which encases the distal ends of said image and light guides.

17. The method as defined in claim 16, wherein said distal end of said scope terminates in a rounded nosepiece which enters said space between said square array of metal tubes during insertion of said scope.

18. The method as defined in claim 17, further comprising the steps of:
  removing said rounded nosepiece;
  attaching a guide tube to said distal end of said scope so that said guide tube surrounds and is eccentric with respect to said metal sheath, said guide tube having a diameter slightly smaller than the diameter of said spacer ferrules;
  removing an upper tie plate and a fuel rod from said fuel bundle assembly, said fuel rod being in contact with said spacer spring to be inspected;
  inserting said distal end of said scope at the top of the space left vacant by said removed fuel rod;
  lowering said distal end of said scope into the space inside a spacer ferrule left vacant by said removed fuel rod until said side aperture of said scope is at the elevation of said spacer spring to be inspected;
  supplying light to said light guide and redirecting said light out said side aperture;
  rotating said distal end of said scope until said spacer spring to be inspected is visible through said ocular lens; and
  visually inspecting for defects that portion of said spacer spring which appears in the image received by said ocular lens.

19. The method as defined in claim 13, further comprising the step of recording the image received by said ocular lens.

* * * * *